US009612827B2

(12) United States Patent
Chen et al.

(10) Patent No.: US 9,612,827 B2
(45) Date of Patent: Apr. 4, 2017

(54) AUTOMATICALLY COMPLETE A SPECIFIC SOFTWARE TASK USING HIDDEN TAGS

(71) Applicant: International Business Machines Corporation, Armonk, NY (US)

(72) Inventors: Hsiao-Yung Chen, New Taipei (TW); Li-Ju Chen, Taipei (TW); Wan-Ping Ting, Taipei (TW); Yu-Hsing Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/737,383

(22) Filed: Jun. 11, 2015

(65) Prior Publication Data

US 2016/0364233 A1    Dec. 15, 2016

(51) Int. Cl.
*G06F 9/44*    (2006.01)
*G06F 11/36*    (2006.01)

(52) U.S. Cl.
CPC ............ *G06F 8/71* (2013.01); *G06F 11/3668* (2013.01)

(58) Field of Classification Search
CPC ........... G06F 8/71; G06F 8/74; G06F 11/3668
USPC .................................................. 717/120–133
See application file for complete search history.

(56) References Cited

U.S. PATENT DOCUMENTS

| 6,085,224 | A | 7/2000 | Wagner |
| 7,216,056 | B2 * | 5/2007 | Kubota ............... G06F 17/3089 |
| | | | 702/179 |
| 7,716,634 | B2 | 5/2010 | Ross et al. |
| 8,255,363 | B2 | 8/2012 | Johnson et al. |
| 8,407,321 | B2 * | 3/2013 | Mickens ............. G06F 11/3414 |
| | | | 709/218 |
| 8,719,814 | B2 | 5/2014 | Wookey |
| 8,799,780 | B2 | 8/2014 | Borkowski et al. |
| 8,832,125 | B2 * | 9/2014 | Boctor ..................... G06F 8/37 |
| | | | 707/758 |
| 8,904,278 | B1 | 12/2014 | Anderson et al. |
| 8,942,735 | B2 * | 1/2015 | Wakayama ........... H04W 36/22 |
| | | | 455/456.1 |
| 2013/0074051 | A1 | 3/2013 | Freeman |

(Continued)

OTHER PUBLICATIONS

James Mickens et al., "Mugshot: Deterministic Capture and Replay for JavaScript Applications", 2010, Proceedings of the 7th USENIX conference on Networked systems, downloaded from http://static.usenix.org/events/nsdi10/tech/full_papers/mickens-mugshot.pdf , 15 pages.*

(Continued)

*Primary Examiner* — Ted T Vo
(74) *Attorney, Agent, or Firm* — Patricia B. Feighan (57) ABSTRACT

A method to detect and diagnose where an error occurs in a source code that is associated with a software program or a website is provided. The method may include receiving a log report associated with the software program or the website, whereby by the log report is sent based on a hidden tag associated with the software program or the website. The method may also include analyzing the received log report. The method may further include detecting at least one error based on the analysis of the received log report. The method may include reverting back to a previous line in the source code associated with the software program or the website, whereby the reverting is based on the detection of the at least one error.

17 Claims, 8 Drawing Sheets

(56) References Cited

U.S. PATENT DOCUMENTS

2013/0339931 A1 12/2013 Rode
2014/0025812 A1 1/2014 Schwarzbauer et al.

OTHER PUBLICATIONS

Behfarshad et al., "Hidden-Web Induced by Client-Side Scripting: An Empirical Study," Proceedings of the International Conference on Web Engineering (ICWE), 2013, p. 52-67.
Mell et al., "The NIST Definition of Cloud Computing," National Institute of Standards and Technology, Sep. 2011, p. 1-3, Special Publication 800-145.

* cited by examiner

AUTOMATICALLY COMPLETE A SPECIFIC SOFTWARE TASK USING HIDDEN TAGS

BACKGROUND

The present invention relates generally to the field of computers, and more particularly to software installations.

Software and websites include many different functions and it may not be easy for a user to follow a guide or manual instructions to use the software. Sometimes, even active users may not know how to use some specific functions in the software because the user may not know which section of the instructions or manual they should be followed first, or which section is not necessary and may not even need to be followed. Additionally, a user may need to set up some configuration before using a particular software or website. However, during the configuration, a user may not be able to complete the installation or configuration of the software due to the wrong command or a bad instruction. As such, a user may try to find out the correct steps or commands by searching on the online help or a manual.

SUMMARY

According to one embodiment, a method to detect and diagnose where an error occurs in a source code that is associated with a software program or a website is provided. The method may include capturing a plurality of snapshots associated with a computer system installation environment during a plurality of key times. The method may also include receiving a log report associated with the software program or the website, whereby by the log report is sent based on a hidden tag associated with the software program or the website. The method may also include analyzing the received log report. The method may further include detecting at least one error based on the analysis of the received log report. The method may include reverting back to a previous line in the source code associated with the software program or the website, whereby the reverting is based on the detection of the at least one error.

According to another embodiment, a computer system to detect and diagnose where an error occurs in a source code that is associated with a software program or a website is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a log report associated with the software program or the website, whereby by the log report is sent based on a hidden tag associated with the software program or the website. The method may also include analyzing the received log report. The method may further include detecting at least one error based on the analysis of the received log report. The method may include reverting back to a previous line in the source code associated with the software program or the website, whereby the reverting is based on the detection of the at least one error.

According to yet another embodiment, a computer program product to detect and diagnose where an error occurs in a source code that is associated with a software program or a website is provided. The computer program product may include one or more computer-readable storage devices and program instructions stored on at least one of the one or more tangible storage devices, the program instructions executable by a processor. The computer program product may include program instructions to receive a log report associated with the software program or the website, whereby by the log report is sent based on a hidden tag associated with the software program or the website. The computer program product may also include program instructions to analyze the received log report. The computer program product may further include program instructions to detect at least one error based on the analysis of the received log report. The computer program product may include program instructions to revert back to a previous line in the source code associated with the software program or the website, whereby the reverting is based on the detection of the at least one error.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to software installations. The following described exemplary embodiments provide a system, method and program product to, among other things, automatically complete a specific software task using hidden tags. Therefore, the present embodiment has the capacity to improve the technical field of installing and configuring software by using a browser plug-in that will find hidden tags in the current page and then perform the appropriate corresponding action. More specifically, the present embodiment may reduce the learning curve for new software, applications, and webpages. Additionally, the present embodiment may provide automated operations with proper environment parameters as well as interactive information for instructing users to the correct steps.

As previously described, a user may need to set up some configuration before using a particular software or website and during the configuration, the user may not be able to complete the installation or configuration of the software due to the wrong command or a bad instruction. As such, a user may try to find out the correct steps or commands by searching on the online help or a manual. However, it may not be easy for a user to find out which section or which steps are needed to be followed during the configuration since it may not be easy for the user to follow the guides or manuals instructions to use, install, or configure the software. For example, a user may be experiencing trouble during using, installing, or configuring software and may not know what to do since it may be difficult to find where the document is to help resolve the problem. Similarly, it may be difficult for the user to know which step is wrong and where the user should start. Furthermore, it may be difficult for the user to know which step the user is currently experiencing difficulty at and where the next step is. Therefore, users may waste a lot of time while searching for the correct answer. As such, it may be advantageous, among other things, to provide a solution, such as the present embodiment described herein, which may help a user use software or a website in a flexible and interactive way. Additionally, by using a method, such as the present embodiment, a user may operate the software or the website with dialog interactions or automation scripts.

According to at least one implementation, the present embodiment may provide a plug-in which is installed in the software or the website and interacts with invisible html tags in the target's source code. The plug-in may then be used to verify the environment parameters and execute the invisible html tags in the target location. Additionally, the operating logs or exception logs may be sent out to a log server to analyze and parse the plug-in for further execution via the scripts.

Furthermore, the invisible html tags may be implemented by tagging diverse information, such as scripts, steps, and dialog codes in the target source. For example, configuration scripts may be tagged in the online-help html page. According to the present embodiment, the invisible scripts in the HTML tags may be marked with a special character for the plug-in to identify and execute the scripts. As such, based on the interactions between the plug-in and the target sources (i.e., invisible html tags), the present embodiment may provide a more flexible and interactive way to aid users to use the software or the website properly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to automatically complete a specific software task using hidden tags. According to the present embodiment, the hidden tags are automatically run for a user to complete the installation or configuration task. As such the hidden tags may start anywhere during the installation, configuration, and operation process and complete the task for user.

As previously described, according to at least one implementation, the present embodiment may provide a mechanism that is able to detect and diagnose where an error associated with a software product or a website takes place. As such, when a user selects the information center web page, the present embodiment may execute scripts that are embedded as hidden tags on the web page automatically or provide pop-up windows to confirm with the user, custom parameters that the user input earlier.

According to the present embodiment, a plug-in may receive the logs from a log diagnosis server. As such, the plug-in may start the actions based on what is received from an event processor to either rollback to a specific step and complete the tasks, or trigger hidden scripts from the invisible tag in the html source file location that was defined in event processor. Additionally, a pop-up dialog may be used by the document writer to correct the steps to make it more clear. Furthermore, the plug-in can also directly detect the errors in a system under test (SUT) and help the user rollback to previous step and interact with user to help complete the task.

Figure 1:
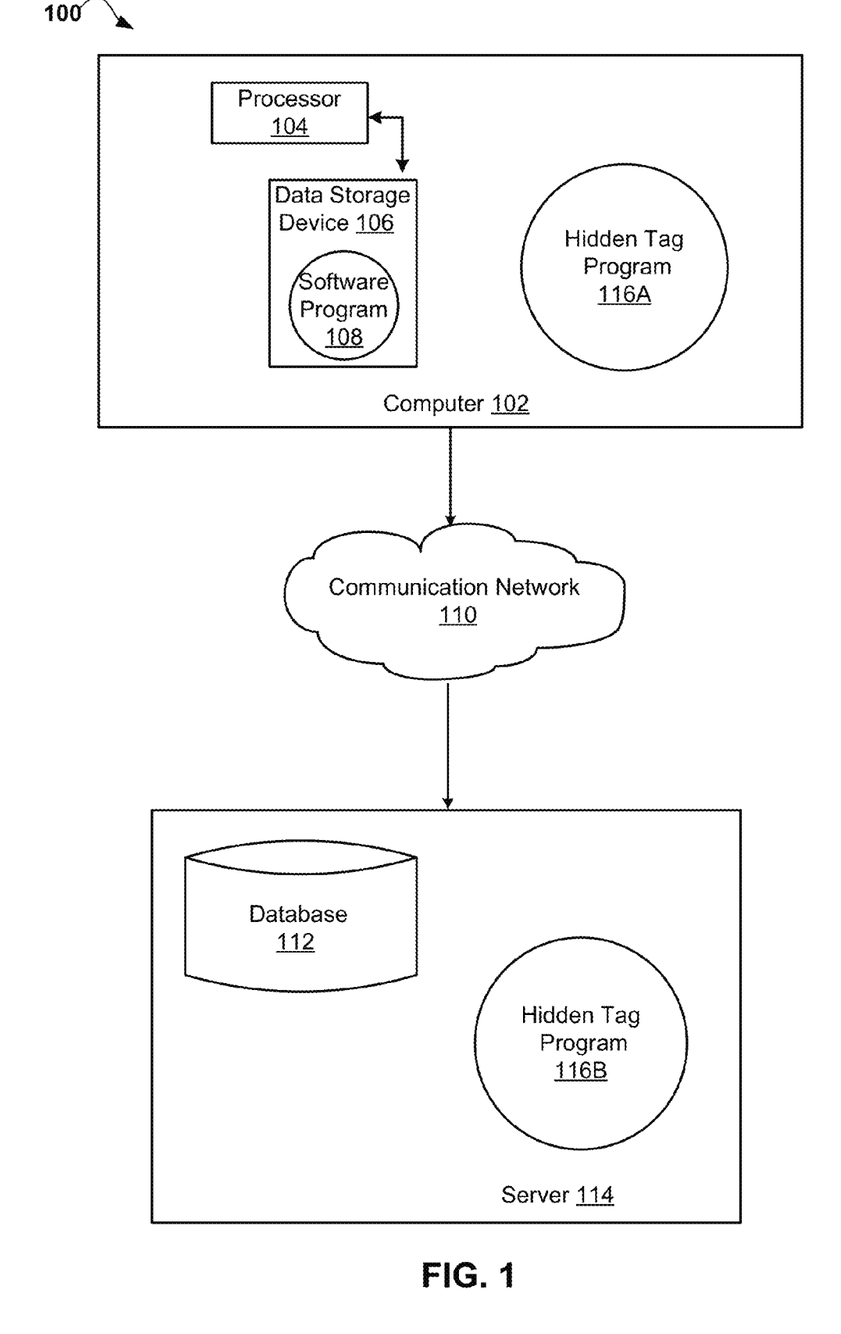
FIG. 1 illustrates a networked computer environment according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Hidden Tag Program 116A. The networked computer environment 100 may also include a server 114 that is enabled to run a Hidden Tag Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Hidden Tag Program 116B running on server computer 114 via the communications network 110. The communications network 110 may include connections, such as wire, wireless communication links, or fiber optic cables. As will be discussed with reference to FIG. 6, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Hidden Tag Program 116A, 116B may interact with a database 112 that may be embedded in various storage devices, such as, but not limited to a computer 102, a networked server 114, or a cloud storage service.

As previously described, the client computer 102 may access the Hidden Tag Program 116B, running on server computer 114 via the communications network 110. For example, a user using a client computer 102 may access the Hidden Tag Program 116A, 116B, running on client computer 102, and server computer 114, respectively via the communications network 110. For example, a user using client computer 102 may connect via a communication network 110 to the Hidden Tag Program 116B which may be running on server computer 114. The user may utilize the Hidden Tag Program 116A, 116B to automatically complete a specific software task using hidden tags. The hidden tag method is explained in more detail below with respect to FIGS. 2-4.

Figure 2:
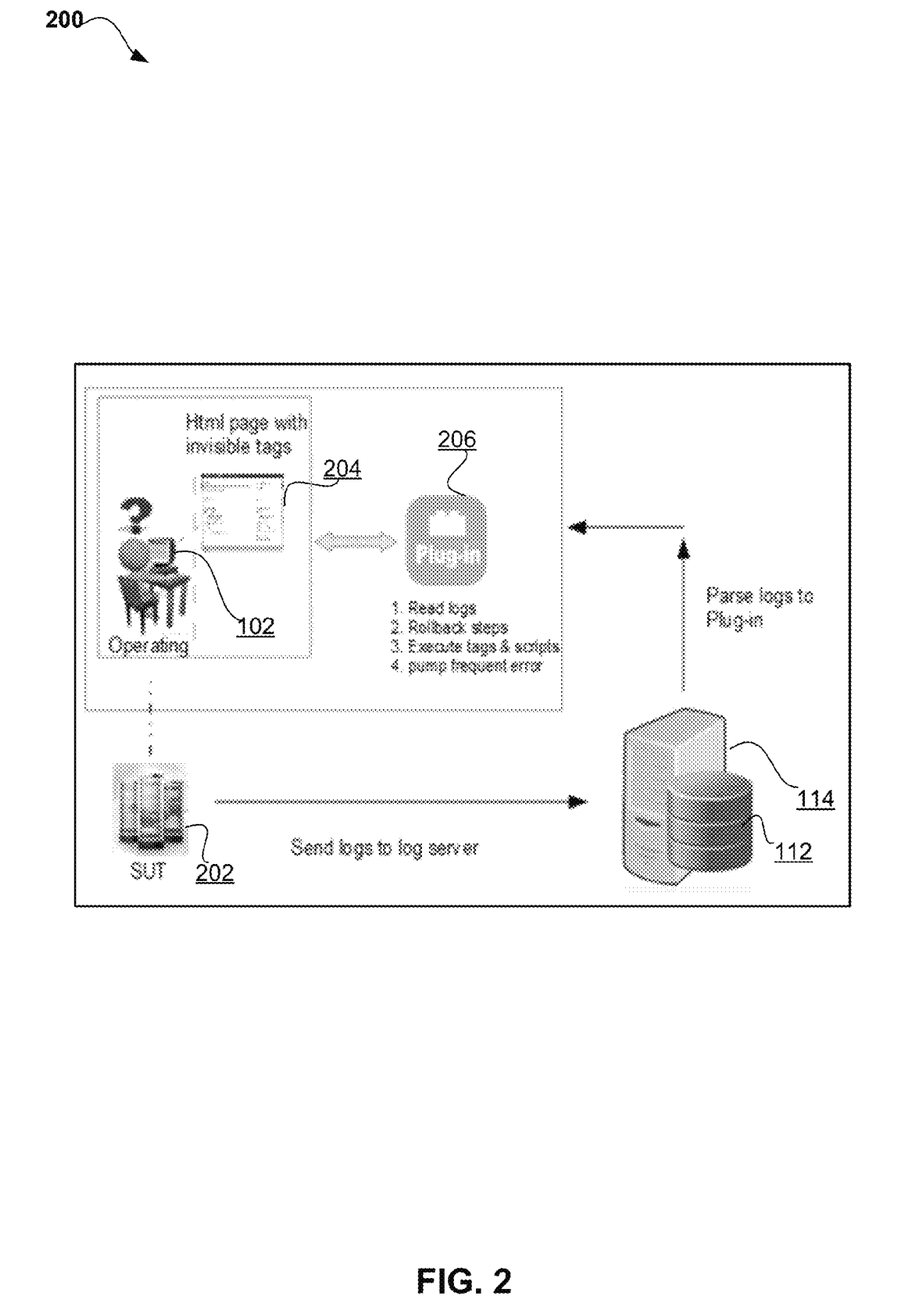
FIG. 2 illustrates an exemplary system diagram according to one embodiment.

Referring now to FIG. 2, an exemplary system diagram 200 in accordance with one embodiment is depicted. As previously described, when a user using a client computer 102 selects the information center web page, the present embodiment may execute scripts that are embedded as hidden tags 204 on the web page automatically or provide pop-up windows to confirm with the user, custom parameters that the user input earlier. According to at least one implementation, the present embodiment includes the use of a log server 114 which may include a log repository 112 that receives, saves, and parses logs; records error frequency; and identifies the client. Then, the log server 114 may pass the parsed logs to a plug-in 206 that reads the logs; rollbacks the steps; executes tags and scripts; and pump frequent errors to a plug-in 206.

More specifically, the plug-in 206 is a browser-based plug-in. According to the present embodiment, the plug-in 206 may perform 3 main functions as follows:

1. The log server 114 will send the user's system log parsing result to the plug-in 206. As such, the plug-in may know which step the user is performing and which step the system should be rolled back to.

2. The plug-in 206 can recognize the invisible tags hidden in HTML source file and execute the script on the target machine 102.

3. The log server 114 will also send information to the plug-in 206 regarding the most frequent error procedures that the user is reading. When the plug-in 206 receives the message, it will check the user's permission and popup a suggested modification dialog.

According to the present embodiment, the log server 114 has a log repository 112 and it will perform the following 3 tasks:

1. It will receive the target machine's 102 system log and parse it using existing technology. After parsing the log, it will know the machine's 102 status and which step should it be rolled back to.

2. The log server 114 will also record the error frequency by all the machine's 102 logs. As such, the log server 114 can send suggestions to eligible users.

3. The log server 114 will identify where the plug-in client 206 is for each target machine so it can send the messages to client.

According to the present embodiment, the system under test (SUT) 202, is a machine that runs the production installation and will perform the following 2 tasks:

1. The SUT 202 will send error logs to log server.

2. The SUT 202 will also send the client internet protocol (IP) which is installed for the specific plug-in 206 to the log server 114.

Figure 3:
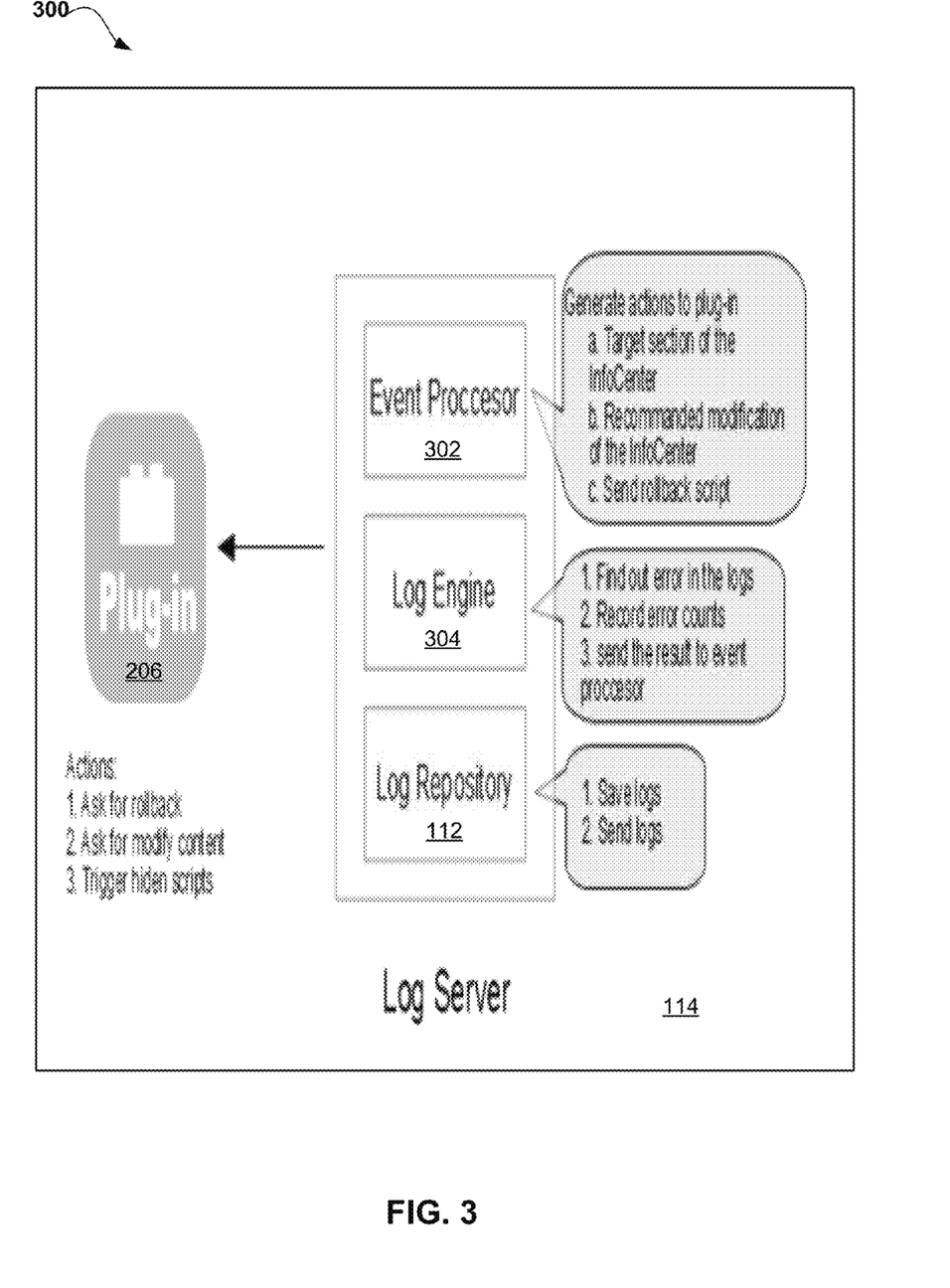
FIG. 3 illustrates an exemplary illustration of a log server according to one embodiment.

Referring now to FIG. 3, an exemplary illustration 300 of a log server in accordance with one embodiment is depicted. The present embodiment may include the use of a log diagnosis server 114 which may include a log repository 112 that saves and sends logs to a log engine 304. The log engine 304 may discover errors in logs and track (i.e., record) the error counts. Then, the log engine 304 will send the result to an event processor 302. Then, based on the errors in the logs and error counts, the event processor 302 may trigger (i.e., generate) certain actions that are passed to a plug-in 206. Such triggered actions may include rolling back the script to the last successful step when the error happened in the user's environment (which is found by the log engine 304); target a section of the information center (i.e., online help); recommend modification of the information center (i.e., modify content of the on-line help); or trigger hidden scripts. Additionally, the event processor 302 may keep the user's input in case the rollback script needs the user's input to get back to the more clean state of the system and help the user complete the starting steps automatically. Furthermore, the event processor 302 may target the section of the information center or online help that has the history of the most errors.

Figure 4:
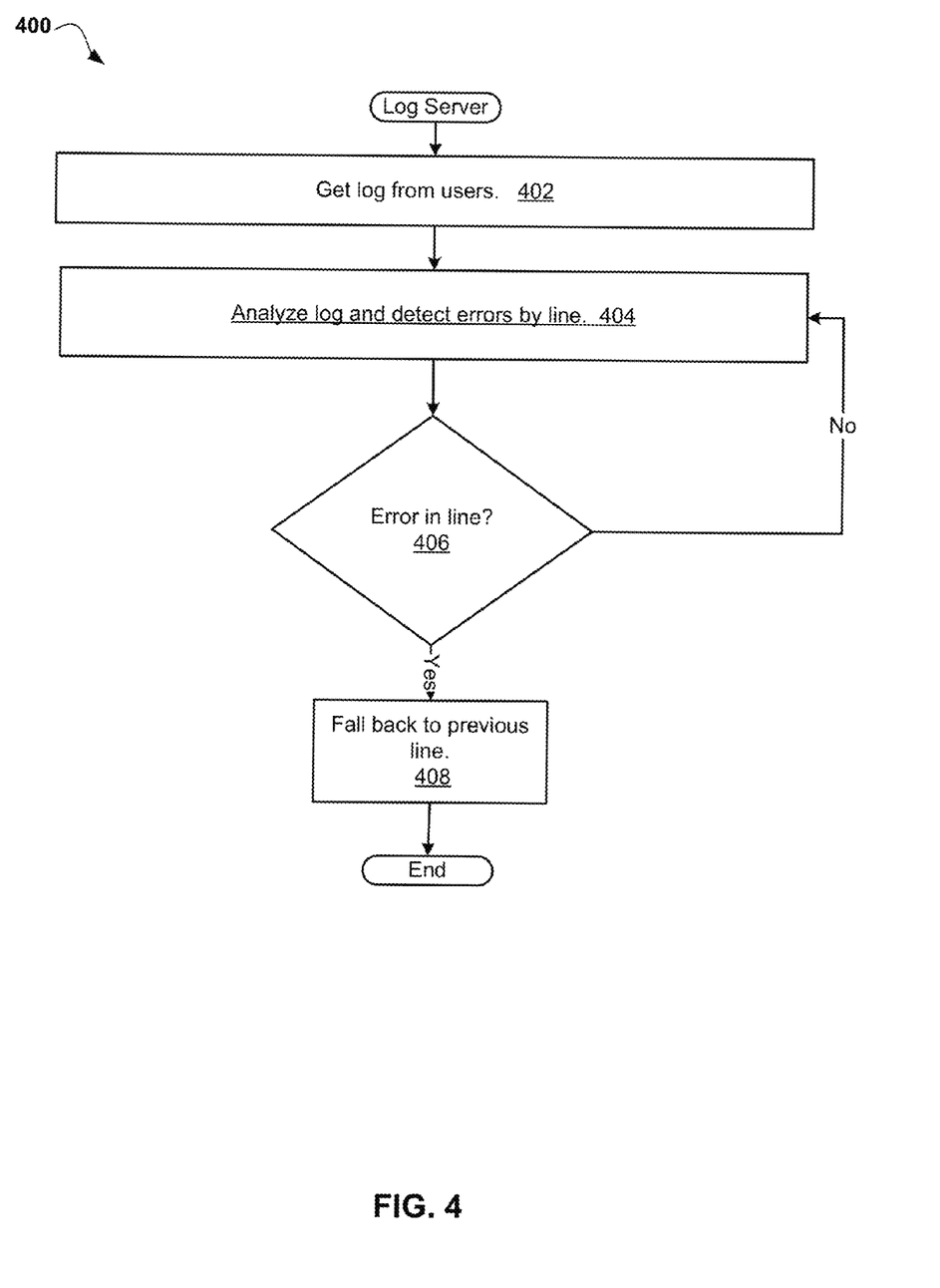
FIG. 4 is an operational flowchart illustrating the steps carried out by a program to automatically complete a specific software task using hidden tags according to one embodiment.

Referring now to FIG. 4, an operational flowchart 400 illustrating the steps carried out by a program to automatically complete a specific software task using hidden tags 204 (FIG. 2) in accordance with one embodiment is depicted. As previously described, the Hidden Tag Program 116A, 116B (FIG. 1) may provide a plug-in 206 (FIG. 2) which is installed in the software or the website and interacts with invisible html tags 204 (FIG. 2) in the target's source code. As such, in the page source code, there will be hidden tags 204 (FIG. 2) inside the HTML comment tags. According to at least one implementation, the hidden tags 204 (FIG. 2) are executable commands for the plug-in 206 (FIG. 2). The plug-in 206 (FIG. 2) may then be used to verify the environment parameters and execute the invisible html tags 204 (FIG. 2) in the target location. Additionally, the operating logs or exception logs may be sent out to a log server 114 (FIG. 2) to analyze and parse the plug-in 206 (FIG. 2) for further execution via the scripts. Additionally, the invisible html tags 204 (FIG. 2) may be implemented by tagging diverse information, such as scripts, steps, and dialog codes in the target source. According to the present embodiment, the invisible scripts 204 (FIG. 2) in the HTML tags may be marked with a special character for the plug-in 206 (FIG. 2) to identify and execute the scripts providing a more flexible and interactive way to aid users to use the software or the website properly.

Therefore with respect to FIG. 4 at 402, the log server 114 (FIG. 2) will obtain the log from the user. As previously explained, the log server 114 (FIG. 2) has a log repository 112 (FIG. 2) and it will receive the target machine's 102 (FIG. 2) system log and parse it.

Then at 404, the log is analyzed and errors are detected by line. According to at least one implementation, after parsing the log, the log server 114 (FIG. 2) will know the machine's 102 (FIG. 2) status and which step should it be rolled back to.

Therefore at 406, it is determined whether an error is found in a line. If an error is not discovered in a line at 406, then the method may continue back to step 404 to continue to analyze the log and detect errors by line.

However, if an error is discovered in a line at 406, then the method continues to step 408 to fall back to the previous line. As such, when an error is detected, the log server 114 (FIG. 2) will send the user's system log parsing result to the plug-in 206 (FIG. 2). As such, the plug-in may know which step the user is performing and which step the system should be rolled back to. As previously described, the plug-in 206 (FIG. 2) can recognize the invisible tags hidden in HTML source file and execute the script on the target machine 102 (FIG. 2).

Figure 5:
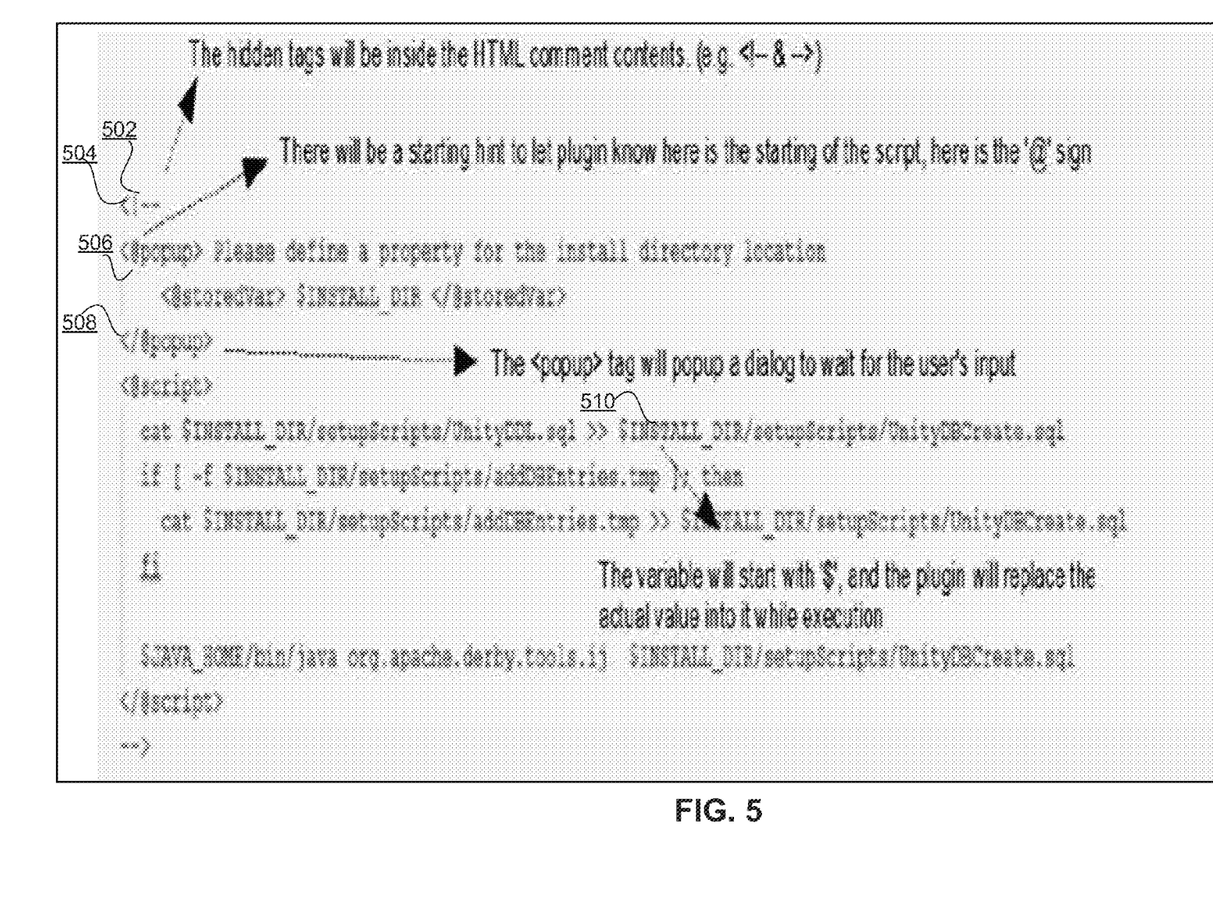
FIG. 5 illustrates an exemplary illustration of pre-defined tags for a script according to one embodiment.

Referring now to FIG. 5, an exemplary illustration 500 of pre-defined tags for a script in accordance with one embodiment is depicted. According to the present embodiment, hidden tags 502 will be inside the HTML comment contents 504 (e.g., <!--&-->). Additionally, there will be a starting hint 506 to let the plug-in 206 (FIG. 2) know that this is where the starting of the script is (e.g., the '@' sign). Furthermore, the <popup> tag 508 will pop up a dialog (e.g., a dialog box via a graphical user interface (GUI)) to wait for the user's input. Also, according to one implementation, the variable 510 may start with a '$', and the plug-in 206 (FIG. 2) will replace the actual value into it during execution.

It may be appreciated that FIGS. 2-5 provide only an illustration of one implementation and do not imply any limitations with regard to how different embodiments may be implemented. Many modifications to the depicted environments may be made based on design and implementation requirements. For example, as previously described, the log server 114 (FIG. 2) will also send information to the plug-in 206 (FIG. 2) regarding the most frequent error procedures that the user is reading. When the plug-in 206 (FIG. 2) receives the message, it will check the user's permission and popup a suggested modification dialog. Additionally, the log server 114 (FIG. 2) will also record the error frequency by all the machine's 102 (FIG. 2) logs. As such, the log server 114 (FIG. 2) can send suggestions to eligible users. Furthermore, the log server 114 (FIG. 2) will identify where the plug-in client 206 (FIG. 2) is for each target machine so it can send the messages to client.

The following are two sample scenarios that the present embodiment may be applied to:

Scenario 1:

Help Users to complete software installation if users encounter any errors during installation:

1. User starts software installation and hits an error during installation.

2. Exception logs will be sent out to the log server 114 (FIG. 2) and parsed and sent to the plug-in 206 (FIG. 2).

3. The plug-in 206 (FIG. 2) will verify the environment parameters and collect what steps the user has performed.

4. The plug-in 206 (FIG. 2) will then execute the invisible html tags 204 (FIG. 2) in the software's information center.

5. The plug-in 206 (FIG. 2) will determine the next steps based on the contents in the invisible tags 204 (FIG. 2). For example, the plug-in 206 (FIG. 2) will pop up a dialog and ask user to input the environment information and continue to finish the installation for user.

Scenario 2:

Help document writers identify which part of the installation guide of the information center that a user encounters errors the most often.

1. The invisible tag 204 (FIG. 2) on the information center HTML collects which steps that users encountered problems in the most.

2. The plug-in 206 (FIG. 2) reads this information and pops up a dialog to the document writer with the script which is in the invisible tag 204 (FIG. 2) or from server alternatively.

3. The document writer correct the steps to make it more clear.

Figure 6:
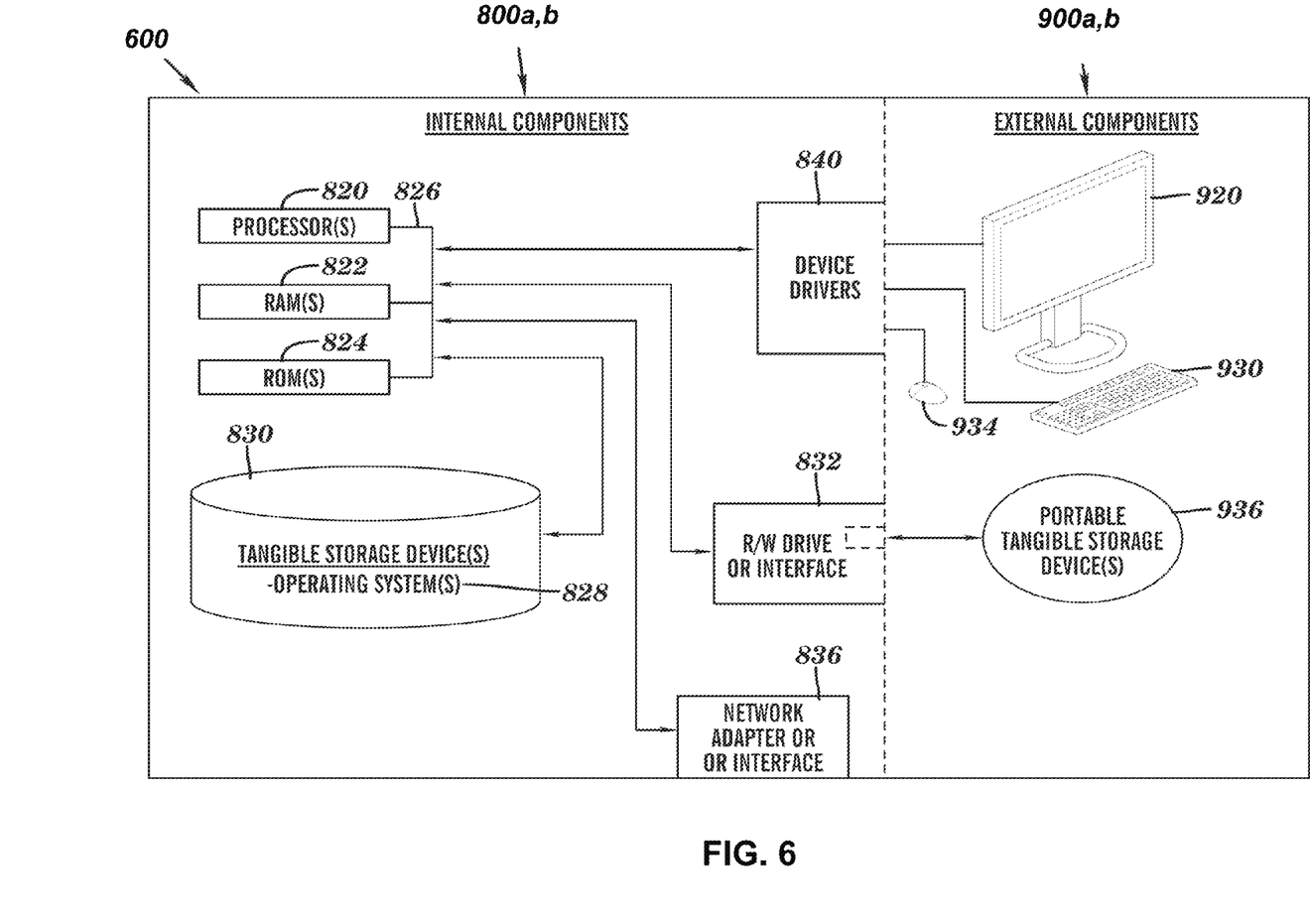
FIG. 6 is a block diagram of internal and external components of computers and servers depicted in FIG. 1 according to one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Hidden Tag Program 116A (FIG. 1) in client computer 102 (FIG. 1) and the Hidden Tag Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Hidden Tag Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Hidden Tag Program 116A (FIG. 1) in client computer 102 (FIG. 1) and the Hidden Tag Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Hidden Tag Program 116A (FIG. 1) in client computer 102 (FIG. 1) and the Hidden Tag Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
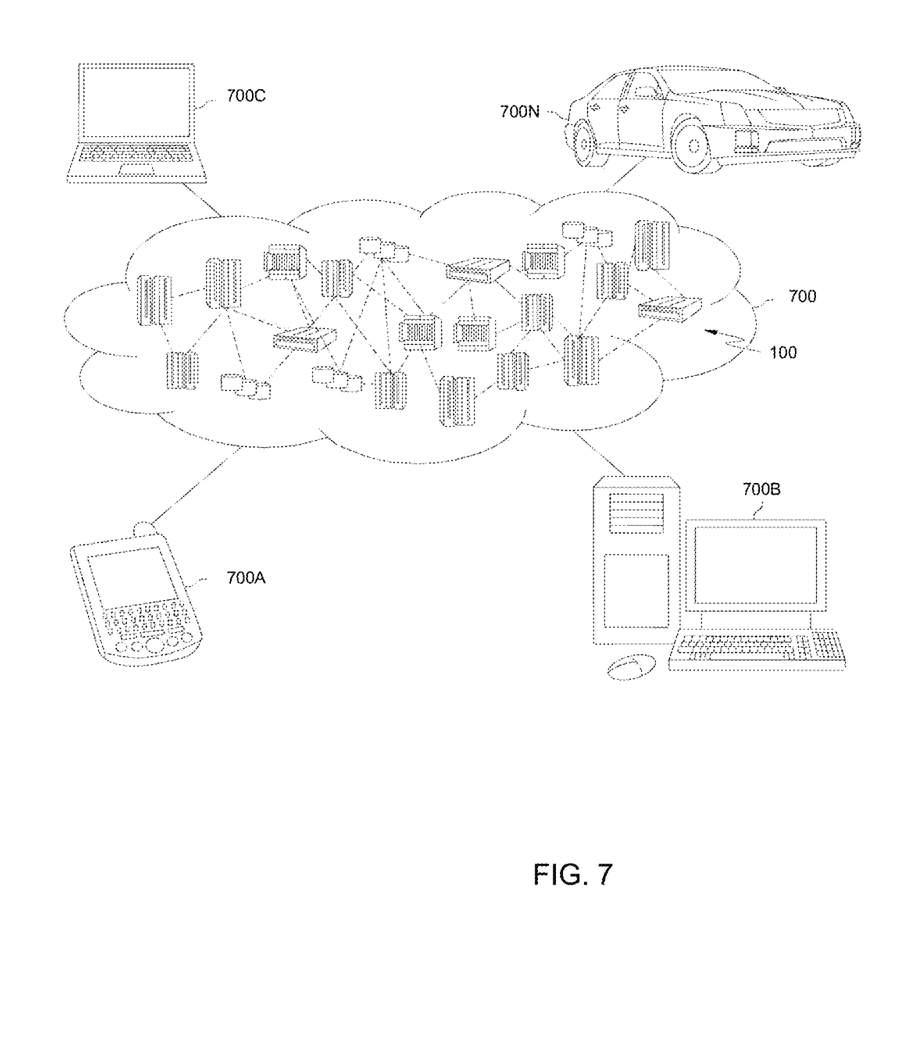
FIG. 7 is a block diagram of an illustrative cloud computing environment including the computer system depicted in FIG. 1, according to one embodiment.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
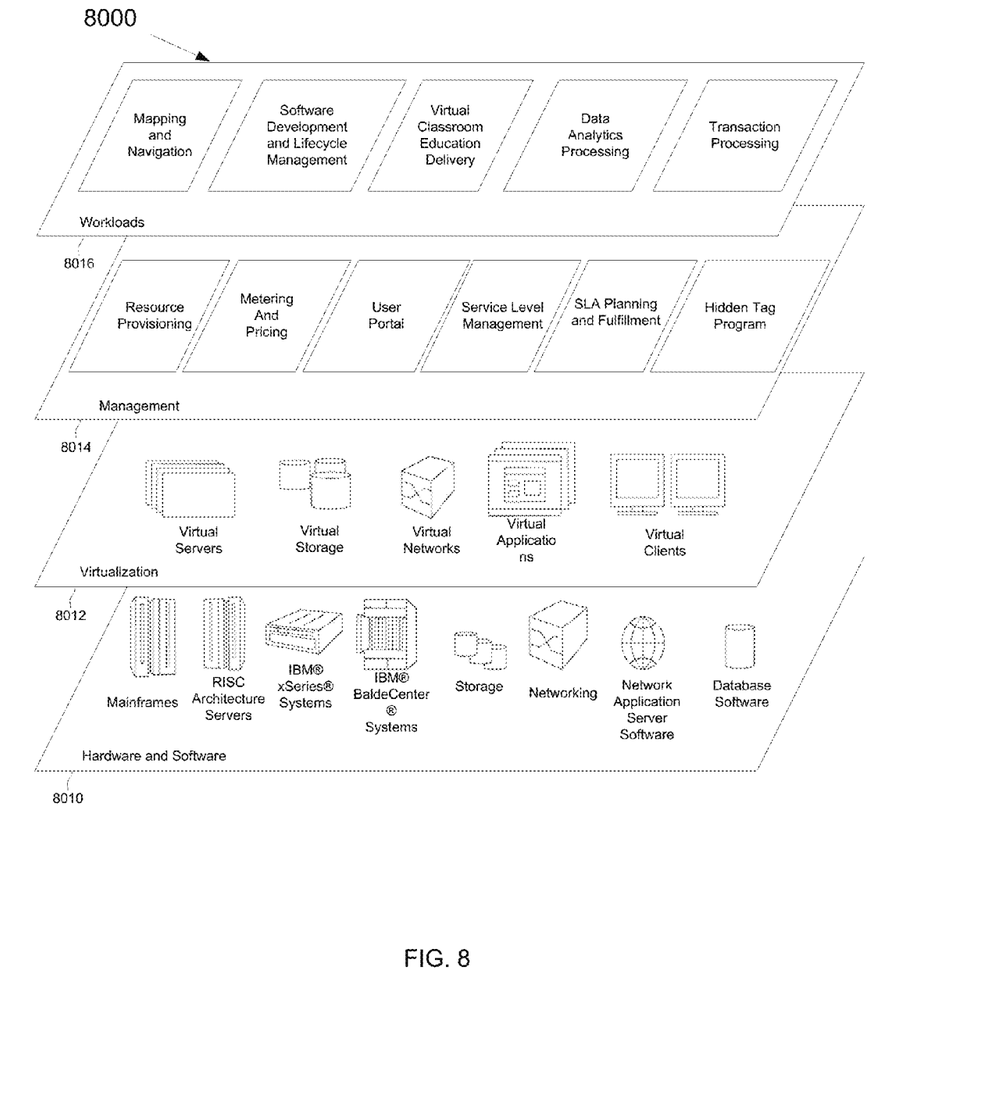
FIG. 8 is a block diagram of functional layers of the illustrative cloud computing environment of FIG. 7 according to one embodiment.

Referring now to FIG. 8, a set of functional abstraction layers 8000 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 8010 includes hardware and software components. Examples of hardware components include: mainframes; RISC (Reduced Instruction Set Computer) architecture based servers; storage devices; networks and networking components. In some embodiments, software components include network application server software.

Virtualization layer 8012 provides an abstraction layer from which the following examples of virtual entities may be provided: virtual servers; virtual storage; virtual networks, including virtual private networks; virtual applications and operating systems; and virtual clients.

In one example, management layer 8014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Hidden Tag Program may automatically complete a specific software task using hidden tags.

Workloads layer 8016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to detect and diagnose where an error occurs in a source code that is associated with a software program or a website, the method comprising:
   receiving a log report associated with the software program or the website, wherein by the log report is sent based on a hidden tag associated with the software program or the website;
   analyzing the received log report;
   detecting at least one error based on the analysis of the received log report;
   executing a last successfully executed line in the source code associated with the software program or the website, wherein the executing of the last successfully executed line in the source code is based on the detection of the at least one error and comprises determining the last successfully executed line in the source code prior to the detection of the at least one error; and
   executing a plurality of hidden scripts associated with the hidden tag associated with the software program or the website, wherein the executed plurality of hidden scripts includes accessing an online help repository by automatically targeting a section of the accessed online help repository that has a history of a greatest number of errors, accessing a plurality of previously entered user input, and displaying, via a graphical user interface, a suggested modification dialog.

2. The method of claim 1, wherein the hidden tag is embedded in the source code associated with the software program or the website.

3. The method of claim 2, wherein the embedded hidden tag is an executable script.

4. The method of claim 1, further comprising:
   receiving a plurality of custom parameters from a user using the software program or the website, wherein the plurality of customer parameters are based on parameters that were input by the user prior to the detection of the at least one error; and
   determining a plurality of next steps associated with the software program or the website based on a plurality of content in the embedded hidden tag and the received plurality of custom parameters.

5. The method of claim 1, further comprising:
   targeting a section of an information center or an online help guide associated with the software or the website, wherein the targeted section comprises the section of the information center or the online help guide that has a greatest history of errors.

6. The method of claim 1, further comprising:
   verifying a plurality of environment parameters associated with the software program or the website; and
   collecting a plurality of steps a user performed prior to the detection of the at least one error.

7. A computer system to detect and diagnose where an error occurs in a source code that is associated with a software program or a website, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   receiving a log report associated with the software program or the website, wherein by the log report is sent based on a hidden tag associated with the software program or the website;
   analyzing the received log report;
   detecting at least one error based on the analysis of the received log report; and
   executing a last successfully executed line in the source code associated with the software program or the website, wherein the executing of the last successfully executed line in the source code is based on the detection of the at least one error and comprises determining the last successfully executed line in the source code prior to the detection of the at least one error; and executing a plurality of hidden scripts associated with the hidden tag associated with the software program or the website, wherein the executed plurality of hidden scripts includes accessing an online help repository by automatically targeting a section of the accessed online help repository that has a history of a greatest number of errors, accessing a plurality of previously entered user input, and displaying, via a graphical user interface, a suggested modification dialog.

8. The computer system of claim 7, wherein the hidden tag is embedded in the source code associated with the software program or the website.

9. The computer system of claim 8, wherein the embedded hidden tag is an executable script.

10. The computer system of claim 7, further comprising:
receiving a plurality of custom parameters from a user using the software program or the website, wherein the plurality of customer parameters are based on parameters that were input by the user prior to the detection of the at least one error; and determining a plurality of next steps associated with the software program or the website based on a plurality of content in the embedded hidden tag and the received plurality of custom parameters.

11. The computer system of claim 7, further comprising:
targeting a section of an information center or an online help guide associated with the software or the website, wherein the targeted section comprises the section of the information center or the online help guide that has a greatest history of errors.

12. The computer system of claim 7, further comprising:
verifying a plurality of environment parameters associated with the software program or the website; and
collecting a plurality of steps a user performed prior to the detection of the at least one error.

13. A computer program product to detect and diagnose where an error occurs in a source code that is associated with a software program or a website, the computer program product comprising:
one or more computer-readable storage devices and program instructions stored on at least one of the one or more tangible storage devices, the program instructions executable by a processor, the program instructions comprising:

program instructions to receive a log report associated with the software program or the website, wherein by the log report is sent based on a hidden tag associated with the software program or the website;

program instructions to analyze the received log report;

program instructions to detect at least one error based on the analysis of the received log report;

program instructions to execute a last successfully executed line in the source code associated with the software program or the website, wherein the executing of the last successfully executed line in the source code is based on the detection of the at least one error and comprises determining the last successfully executed line in the source code prior to the detection of the at least one error; and program instructions to execute a plurality of hidden scripts associated with the hidden tag associated with the software program or the website, wherein the executed plurality of hidden scripts includes accessing an online help repository by automatically targeting a section of the accessed online help repository that has a history of a greatest number of errors, accessing a plurality of previously entered user input, and displaying, via a graphical user interface, a suggested modification dialog.

14. The computer program product of claim 13, wherein the hidden tag is embedded in the source code associated with the software program or the website.

15. The computer program product of claim 14, wherein the embedded hidden tag is an executable script.

16. The computer program product of claim 13, further comprising:
receiving a plurality of custom parameters from a user using the software program or the website, wherein the plurality of customer parameters are based on parameters that were input by the user prior to the detection of the at least one error; and determining a plurality of next steps associated with the software program or the website based on a plurality of content in the embedded hidden tag and the received plurality of custom parameters.

17. The computer program product of claim 13, further comprising:
targeting a section of an information center or an online help guide associated with the software or the website, wherein the targeted section comprises the section of the information center or the online help guide that has a greatest history of errors.

* * * * *